United States Patent [19]
Cervini

[11] Patent Number: 5,862,226
[45] Date of Patent: Jan. 19, 1999

[54] AUTOMATIC MODE DETECTION IN DIGITAL AUDIO RECEIVERS

[75] Inventor: Stefano Cervini, Varese, Italy

[73] Assignee: SGS-Thomson Microelectronics S.r.l., Agrate Brianza, Italy

[21] Appl. No.: 798,618

[22] Filed: Feb. 11, 1997

[30] Foreign Application Priority Data

Feb. 16, 1996 [EP] European Pat. Off. ............... 96830072

[51] Int. Cl.$^6$ ...................................................... H04H 5/00
[52] U.S. Cl. ............................................... 381/2; 370/208
[58] Field of Search .......................... 381/2, 1; 455/42, 455/45, 44; 370/208, 210, 484

[56] References Cited

U.S. PATENT DOCUMENTS

| 5,602,832 | 2/1997 | Hudson | 370/208 |
| 5,610,908 | 3/1997 | Shelswell et al. | 370/210 |
| 5,675,608 | 10/1997 | Kim et al. | 370/208 |
| 5,682,376 | 10/1997 | Hayashino et al. | 370/206 |
| 5,729,570 | 3/1998 | Magill | 370/210 |

FOREIGN PATENT DOCUMENTS

| 0 682 426 A2 | 5/1995 | European Pat. Off. . |
| 0 689 307 A1 | 5/1995 | European Pat. Off. . |
| 0 689 314 A1 | 5/1995 | European Pat. Off. . |
| 0 689 308 A1 | 6/1995 | European Pat. Off. . |

*Primary Examiner*—Vivian Chang
*Attorney, Agent, or Firm*—Allen, Dyer, Doppelt, Milbrath & Gilchrist, P.A.

[57] ABSTRACT

The broadcast mode of the different ones set by the international standards for digital audio broadcasting (DAB) according to a coded orthogonal frequency division multiplexing scheme (COEFDM) may be automatically detected in a receiver through a detection routine. Many of the calculation modules required by the automatic mode detection system of the invention are already present in a receiver and can be exploited for performing the digital signal processing that leads to an automatic recognition of the broadcast mode of the station on which the receiver is tuned.

11 Claims, 6 Drawing Sheets

AUTOMATIC MODE DETECTION IN DIGITAL AUDIO RECEIVERS

FIELD OF THE INVENTION

The present invention relates to receivers for Digital Audio Broadcasting Systems (DAB), operating in a Coded Orthogonal Frequency Division Multiplexing mode (COFDM), according to the international standards (ETS 300.401). More particularly, the present invention relates to an automatic mode detection system of transmission (AMD) among the different transmission modes specified by the standards.

BACKGROUND OF THE INVENTION

Digital audio broadcasting systems (DAB) envisage, according to the international standards ETS 300.401, four different broadcasting modes, each of which is characterized by different combination of values assigned to time/frequency parameters relative to the COFDM modulation (Coded Orthogonal Frequency Division Multiplexing). Of course, the broadcast medium may be different (cable, terrestrial free space, satellite, or optical fiber), though the medium more widely used for this type of broadcasting is optical fiber. The broadcasting mode is not strictly tied to the broadcast medium even if this parameter is important for choosing the mode.

Generally speaking, for a given broadcasting medium and for certain frequency bands, one broadcasting mode might be more adequate than another.

One of the key components of DAB receivers being developed is an ASIC device that integrates the necessary circuit for the COFDM mode modulation. Among other fundamental functions, this integrated device calculates the Fast Fourier Transform (FFT), the Inverse Fast Fourier Transform (IFFT), and performs a differential demodulation of the received signal.

A first generation of these ASIC devices has already been produced and developed, however these devices cannot support an automatic detection of the broadcasting mode of the signal received. Furthermore, such a fundamental input relative to the broadcasting mode must be manually supplied to the device via hardware selection.

Therefore, there exists a clear need and usefulness for an automatic broadcasting mode detection system that may be easily integrated into the ASIC device of COFDM mode modulation, so to eliminate the need to provide, from external sources, an indication of the broadcasting mode, in order to correctly set the COFDM mode modulation parameters.

SUMMARY OF THE INVENTION

This objective is fulfilled by the system of the present invention. The automatic broadcasting mode detection system of the invention is integrable in an ASIC device for COFDM mode modulation, already containing FFT and IFFT calculation cells. Fundamentally, the automatic mode detection (AMD) method of the invention is implementable in a DAB receiver functioning according to a coded orthogonal frequency division multiplexing scheme (COFDM) via the following steps.

1) Calculating the Fast Fourier Transform (FFT) and thereafter the Inverse Fast Fourier Transform (IFFT) of the digital signal received as input, according to a time decimation algorithm, of the type commonly referred to as "butterfly". This calculation is carried out in parallel for different numbers of samples of the input signal, by performing a division among complex numbers in a Cartesian form, (I/Q), the dividend of which is represented by the signal in a Cartesian form, (I/Q), resulting from the calculation of the FFT, while the divider is a preestablished variable complex number, pertaining to one of the different broadcasting modes, and having the form: $kp/2$, where $k=0$, 1, 2, 3, each value of k corresponding, for example, to one of four different broadcasting modes according to the ETS 300.401 standards.

2) Calculating the square of the module of the IFFT calculation results, relatively to the numerical sequences corresponding to the different numbers of samples.

3) Detecting the peaks of the different numerical sequences resulting from the preceding calculation of the square and accumulating the relative peak values in an N number of registers, for each of the sequences.

4) Discriminating and registering in a dedicated register the maximum value among the peak values accumulated in the N register for each of the sequences.

5) Calculating, by pairs of the numerical sequences, the square of the difference among the values of the N registers, normalized by dividing them by the respective maximum peak value, and storing the result in a dedicated register.

6) Selecting the minimum value among the results stored in the dedicated registers, as information for the broadcasting mode according to a relative "truth table".

The above indicated procedure stops upon the acquisition of the information that unequivocally identifies the broadcasting mode.

The information so automatically generated within the COFDM chip is then utilized for setting a variable (a register) that represents the number of samples upon which it is necessary to perform a Fast Fourier Transform (FFT) for demodulating the subsequent COFDM symbols. Indeed, given that the time/frequency parameters relative to the modulation COFDM differ among each other, for the various broadcasting modes, only by a scale factor, it is sufficient to set a unique variable (register) pursuant to the detection of the broadcasting mode.

The various aspects of the functional architecture of the automatic broadcasting mode detection of the invention are illustrated in the following description of an embodiment according to the attached drawings, wherein:

DETAILED DESCRIPTION OF THE PREFERRED EMBODIMENTS

Figure 1:
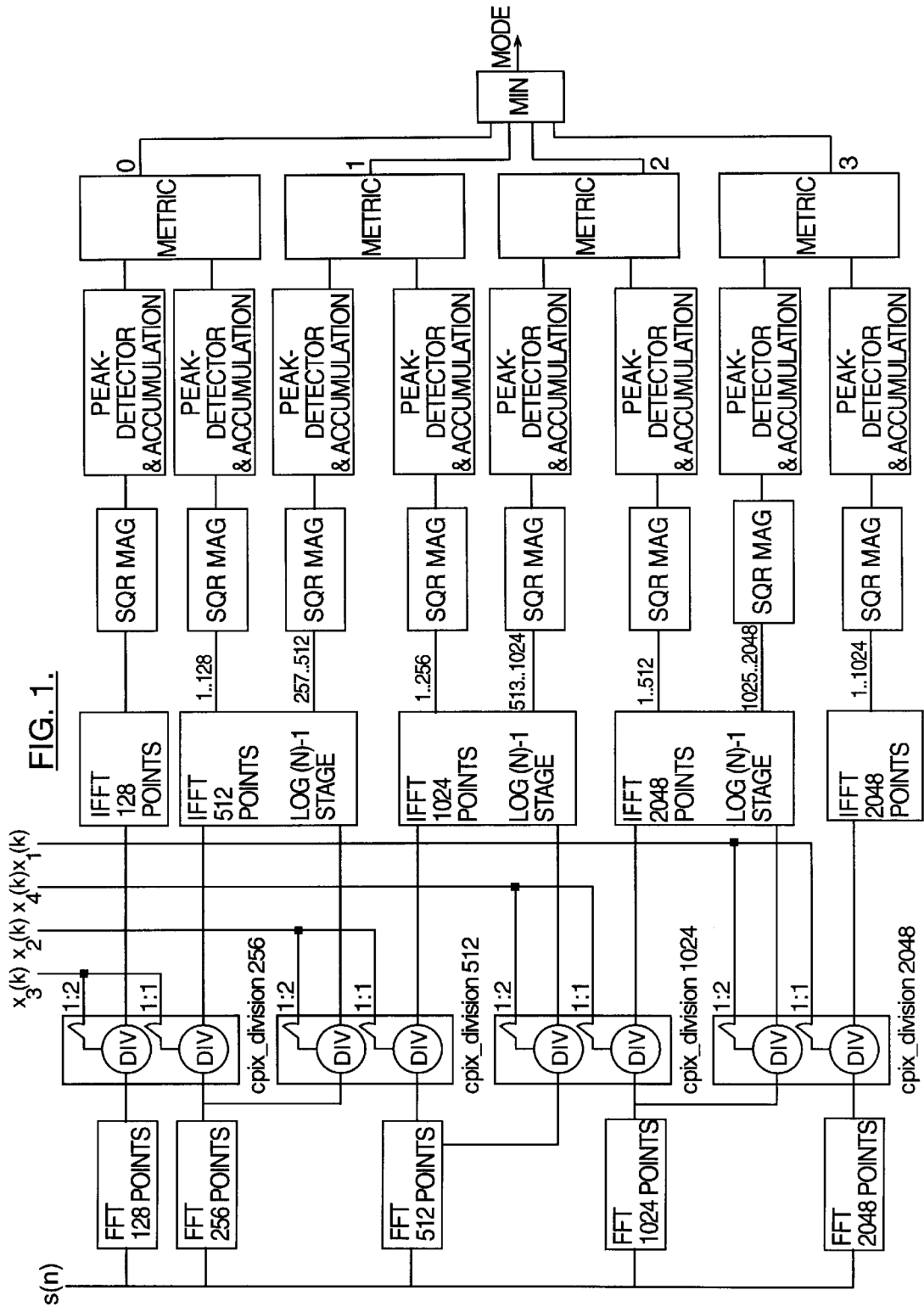
FIG. 1 is a functional scheme of the system object of the present invention.

By referring to the functional scheme of FIG. 1, the FFT blocks and the IFFT blocks are modules that, for the example considered, execute the calculation of the Fast Fourier Transform and the Inverse Fast Fourier Transform, respectively, according to a time-base decimation algorithm, referred to as a "butterfly" type of decimation algorithm, on 128, 256, 512, 1024 and 2048 samples. This algorithm is well known and a detailed description thereof is reported in the volume: "Numerical Processing Signals", by Oppenhaim-Schaffer, pages 332, 334, the content of which is herein incorporated by express reference.

Substantially, for calculating the Inverse Fast Fourier Transform on 2×N samples of the input signal s(n), it is possible to calculate only one Inverse Fast Fourier Transform on 2×N samples with a processing network structure having a number of stages equal to log(n)−1, that is, eliminating a stage in respect to a normal network structure. The eliminated stage may be either the first or the last stage of the processing network, depending on the type of processing network utilized.

These networks or processing modules already exist in a COFDM modemodulation device. Therefore, the FFT and IFFT blocks of the diagram of FIG. 1 are familiar to a person skilled in the art as these modules are widely used in many digital signal processing applications and in particular in OFDM systems. A detailed description of these standard processing modules or networks is not considered necessary for one of skill in the art to fully understand and practice the system object of this invention.

According to a first aspect of the present invention, on the numerical values or sequences resulting from the calculation of the Fast Fourier Transform relative to the different number of samples of calculation, namely: 128, 256, 512, 1024, a division among complex numbers in a Cartesian form (I/Q) is carried out. The dividends used are the same numerical sequences, in a I/Q form as produced by the relative FFT modules of Fast Fourier Transform calculation. The divider is a variable complex number, as specified by the relative standard ETS 300.401. This divider is a value of the type: $k\pi/2$, where k=0, 1, 2, 3. Therefore this mathematical division is relatively simple to perform.

The value of k does not depend only on the broadcasting mode (m), but is a function of both m (with m=1, 2, 3, 4) and a progressive index n of the input sequence of the dividing circuit, for example n=1, 2, . . . Lm, where L1=2048, L2=512, L3=256 and L4=1024, according to the sample implementation of FIG. 1. Therefore, the function k=f(n;m) can be defined as follows:

| f(n;m) = p(n;m) | if n < $P_m/2$ | or $n^3L_m - P_m/2$ |
|---|---|---|
| f(n;m) = 0 | in all other cases | | where: P1=1536, P2=384, P3=192, PL4=768, and p(n;m) being provided in a table format by the standard ETS 300.401.

In particular, in the considered example, by indicating with k the divider with the pair (I, Q) the dividend, and with the pair (a, b) the result, it can be easily verified that the following four cases may take place:

| k = 0, | a = I, | b = Q; |
| k = 1, | a = −Q, | b = I; |
| k = 2, | a = −I, | b = −Q; |
| k = 3, | a = −Q, | b = −I. |

Figure 2:
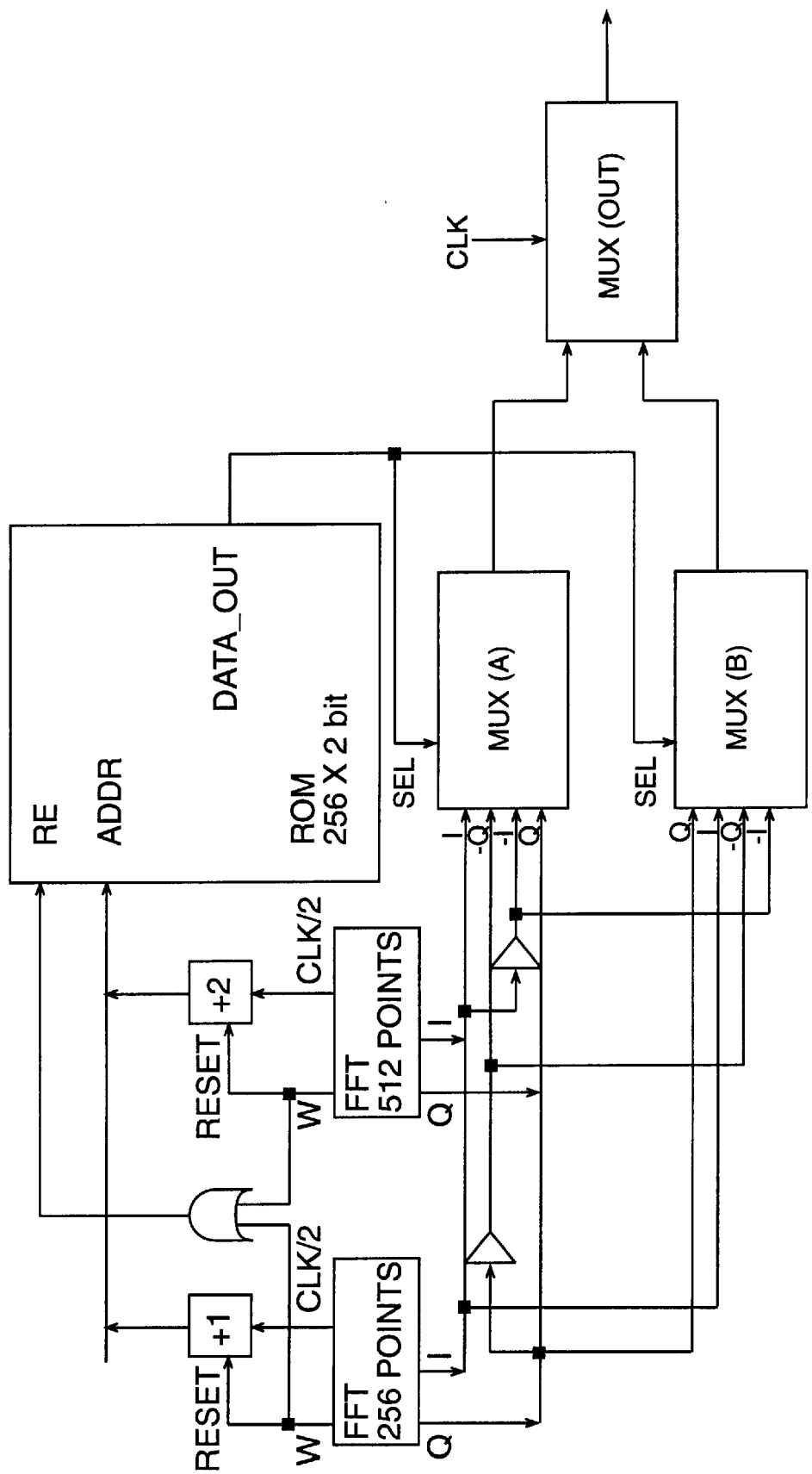
FIG. 2 shows a detailed architecture of the circuit blocks used for performing the division among complex numbers, contemplated in the functional scheme of FIG. 1.

A sample block diagram of one of the four cplx_division ( . . . ) blocks of the scheme of FIG. 1 that carry out such a division among complex numbers in Cartesian form is shown in FIG. 2. It is observed that, depending on the value of k (2 bits per value according to the standard ETS 300.401), depends the selection of the two output values chosen among I, −I, Q and −Q.

By storing in a dedicated register ROM, the values of k corresponding to the standard ETS 300.401, the division is realized using two multiplexers MUX(A) and MUX(B), whose inputs are respectively I, −Q, −I, Q and Q, I, −Q, −I, the selection commands of which (sel) are the value of k read from the ROM.

By referring to the scheme of FIG. 1, the four blocks cplx_division_256, cplx_division_512, cplx_division_1024, and cplx_division_2048, represent the divider blocks, linked to the registers ROM of 256, 512, 1024, 2048 word×2 bit (words of 2 bits each, respectively). The two multiplexers MUX(A) and MUX(B) of each cplx_division_( . . . ) division block are engaged in different phases and with two different reading "frequencies" of the ROM, namely: 1:2 the first and 1:1 the second.

In this particular context, by the expression "reading frequency" it is not intended the reading speed (that is the number of words read per unit of time), but which words are being read among those stored. The expression "reading frequency" in this particular context, being that of a simulation model according to which a sampler acquires samples from a source line, by periodically closing (that is with a certain frequency) a link with this source line. A 1:1 reading frequency of the ROM corresponds to the sequential reading of all the words stored in it, whereas a 1:2 reading frequency is equivalent to the reading of one word per each pair of consecutive words stored in the ROM.

During a first phase, a division by a dividend represented by the numerical sequence output by the calculation block of the Fast Fourier Transform, calculated on a halved number of samples with respect to the dimension of the ROM register of the divider is carried out. While during a second phase, the calculation is performed with the numerical sequence output by the calculation block of the Fast Fourier Transform, calculated on a number of samples equal to the dimension of the ROM register of the divider. By virtue of the fact that the results of the calculation of the two processing blocks of the Fast Fourier Transform involved are available during nonoverlapping phases, respectively, there will not be "collisions" during the reading from the ROM of the respective divider values k.

The scheme of FIG. 2 comprises an output multiplexer MUX(out), timed by the clock signal CLK. The output numerical sequences of the IFFT blocks that calculate the Inverse Fast Fourier Transform, are fed to the input of as many circuit blocks Sqr Mag, which calculate the square of the module of the results produced by the respective IFFT blocks.

Figure 3:
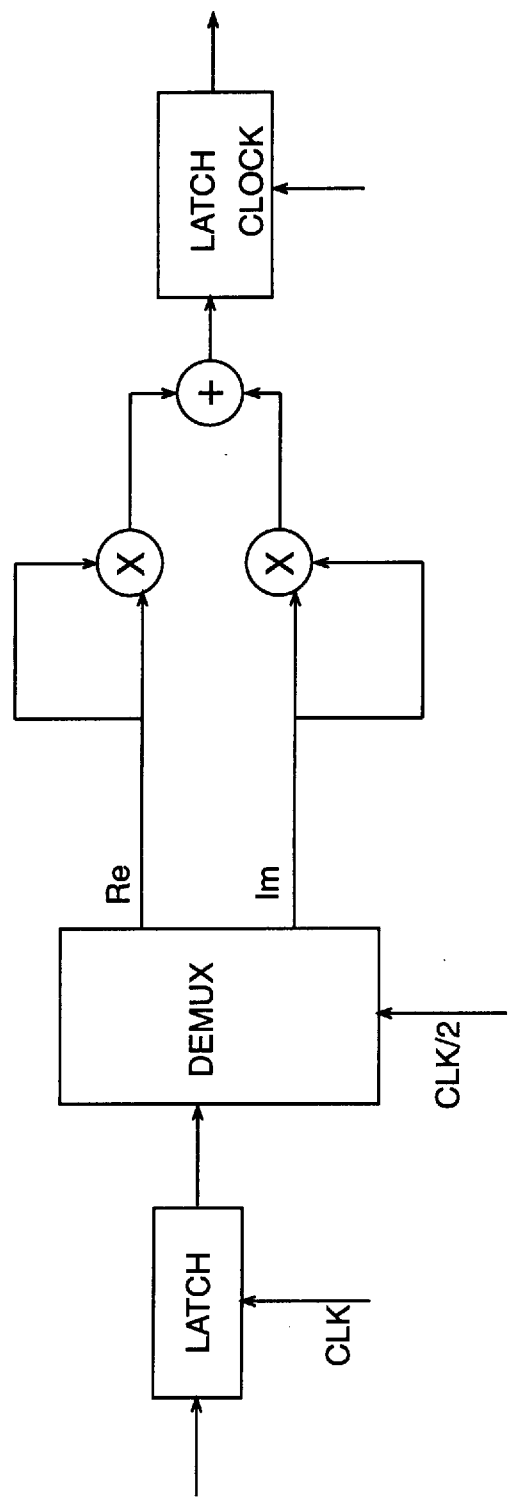
FIG. 3 shows a detailed architecture of the blocks Sqr Mag of FIG. 1 that calculate the square of the module of the value resulting from the IFFT calculation.

FIG. 3 shows a possible architecture of these circuit blocks Sqr Mag, the numerical sequence produced by the relative IFFT block being fed to the input latch. As indicated in FIG. 1, the input sequences to the various blocks Sqr Mag have lengths of 128, 128, 256, 256, 512, 512, 1024, 1024 complex samples, respectively. The indexes of the output samples of the IFFT blocks, which reach the input of the respective Sqr Mag block, thus attaining the indicated lengths, are shown in the scheme of FIG. 1.

Given that the complex samples are in an interleaved format Re/Im, it is necessary to demultiplex the two components, in order to calculate $Re^2+Im^2$, as symbolically highlighted in the functional scheme of FIG. 3.

Figure 4:
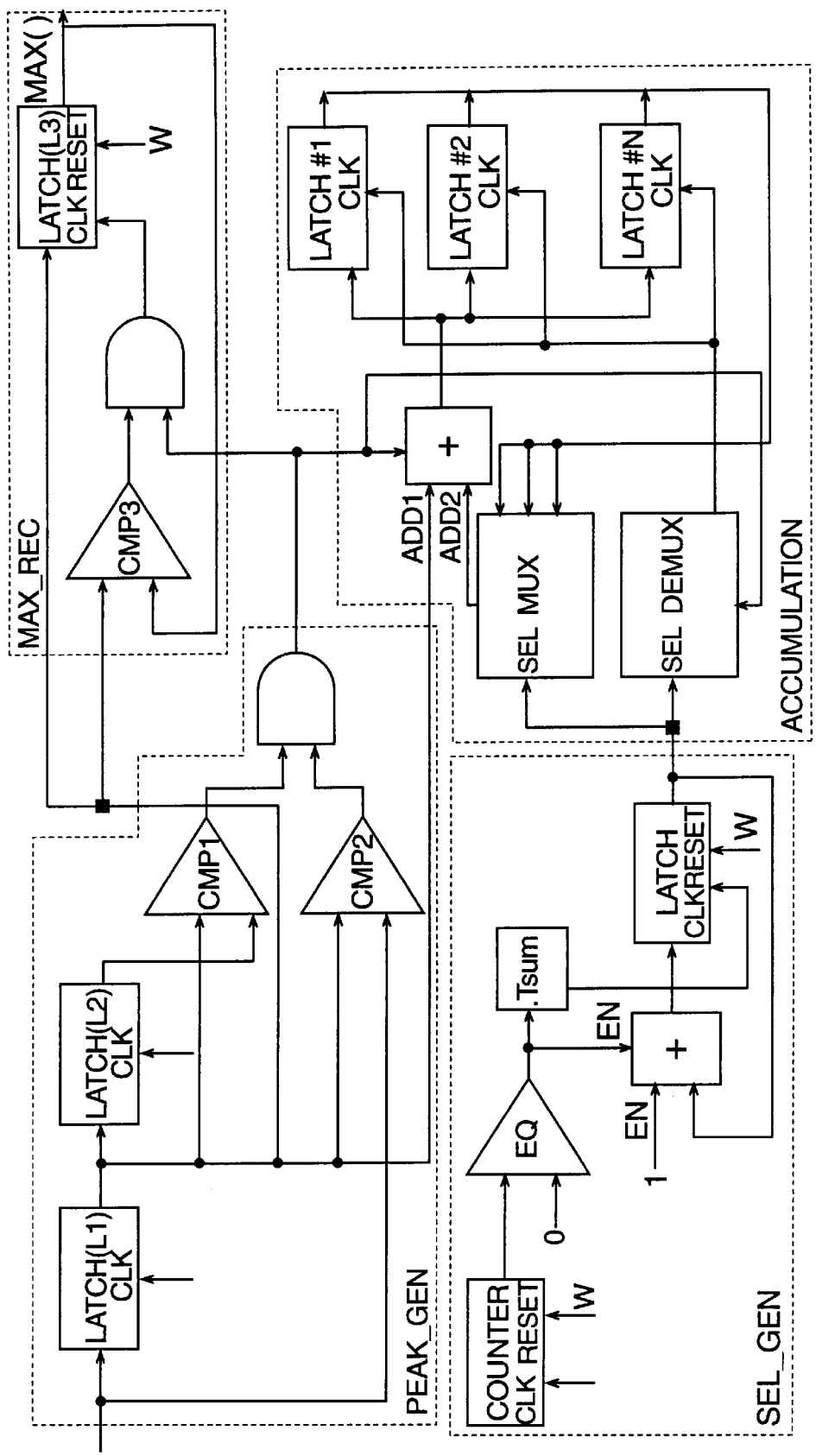
FIG. 4 shows a detailed architecture of the Peak Detection & Accumulation blocks of FIG. 1 used for detecting the peaks of each of the numerical sequences produced by the calculation blocks of the square of the module of the results of the calculation of the IFFT, for accumulating the peak values in a number N of registers and for discriminating and storing of, in a further register, the maximum peak value.

A circuital block denominated Peak Detection & Accumulation, the architecture of which is detailed in FIG. 4, is in cascade of each Sqr Mag block. The numerical input sequence of each Peak Detection & Accumulation block is provided by the sequence output by the block that calculates the square of the module of the results of the calculation of the Inverse Fast Fourier Transform. The lengths of the input sequences to the various Peak Detection & Accumulation blocks of the whole scheme of FIG. 1 are of 128, 128, 256, 256, 512, 512, 1024, 1024 values, respectively.

In order to facilitate the reading of the scheme of FIG. 4, the Peak Detection & Accumulation block can be ideally subdivided in four subblocks, identified by dotted line perimeters, respectively, and called peak_gen, max_rec, sel_gen and accumulation. Essentially the input block, that is, the input latch L1 of the subblock peak_gen is fed with the numerical sequence output by the corresponding Sqr Mag block. Therefore, at each clock pulse (clk), at the input of such an input latch L1, at the output of same latch L1 and at the output of the successive latch L2 there will be the values corresponding to three successive values of the input sequence, respectively. Therefore the output of the AND gate of the peak_gen block, will be at the logic value "1" when the intermediate value of the three successive samples is greater than the two adjacent samples.

The structure of the max_rec block is immediately comprehensible to one skilled in the art. The output (max) of the latch L3 corresponds to the maximum peak value detected.

The block sel_gen generates a selection signal (sel) for the multiplexer MUX and for the demultiplexer DEMUX. The counter is an Mbit counter, with N*N equal to the length of the input sequence (for example N=8). Therefore, every M clock pulses, the output is equal to zero and the selection signal sel is incremented by a unit.

One of the N output registers (LATCH#1, LATCH#2, . . ., LATCH#N) is incremented by a quantity corresponding to the value of the currently detected peak value (add1). The selection of a particular register depends on the value of the selection signal sel. The multiplexer MUX selects for reading such a register, that is to bring on the add2 wire the current content of the register, while the demultiplexer DEMUX selects the register for writing, that is for updating the content of the register with the result provided by the sum block (+).

The signal W undergoes a logic transition from 0 to 1 in coincidence with the first of such values of the numerical input sequence, providing to reset to zero the counter and the two latches associated therewith. The counter has a capacity of an M number of bits, with M*N being equal to the length of the input sequence of the block (for example N=8). Therefore, every M number of clock pulses, the output is equal to zero. The Tsum block represents a delay intervening between a transition 0–1 of the EN signal that enables the sum block (+) and the validation of the output result.

The circuit of each Peak Detection & Accumulation block detects the peak value within the input numerical sequence and stores these peak values in an N number of registers (LATCH#1, LATCH#2, LATCH#N). In practice, the k-th register, accumulates the peak values comprised in the k-th subsequence of length L/N, where L represents the length of the input sequence. Moreover, the circuit of the subblock max_rec, shown in FIG. 4, discriminates the maximum peak value (max), storing it in a dedicated output latch (L3). The four blocks metric of the scheme of FIG. 1, calculate the square of the difference of the sum of the values of the N registers of the Peak Detection & Accumulation blocks, relative to two different sequences (derived from the different input sequences for a different number of calculation points of the FFT and of the IFFT).

Figure 5:
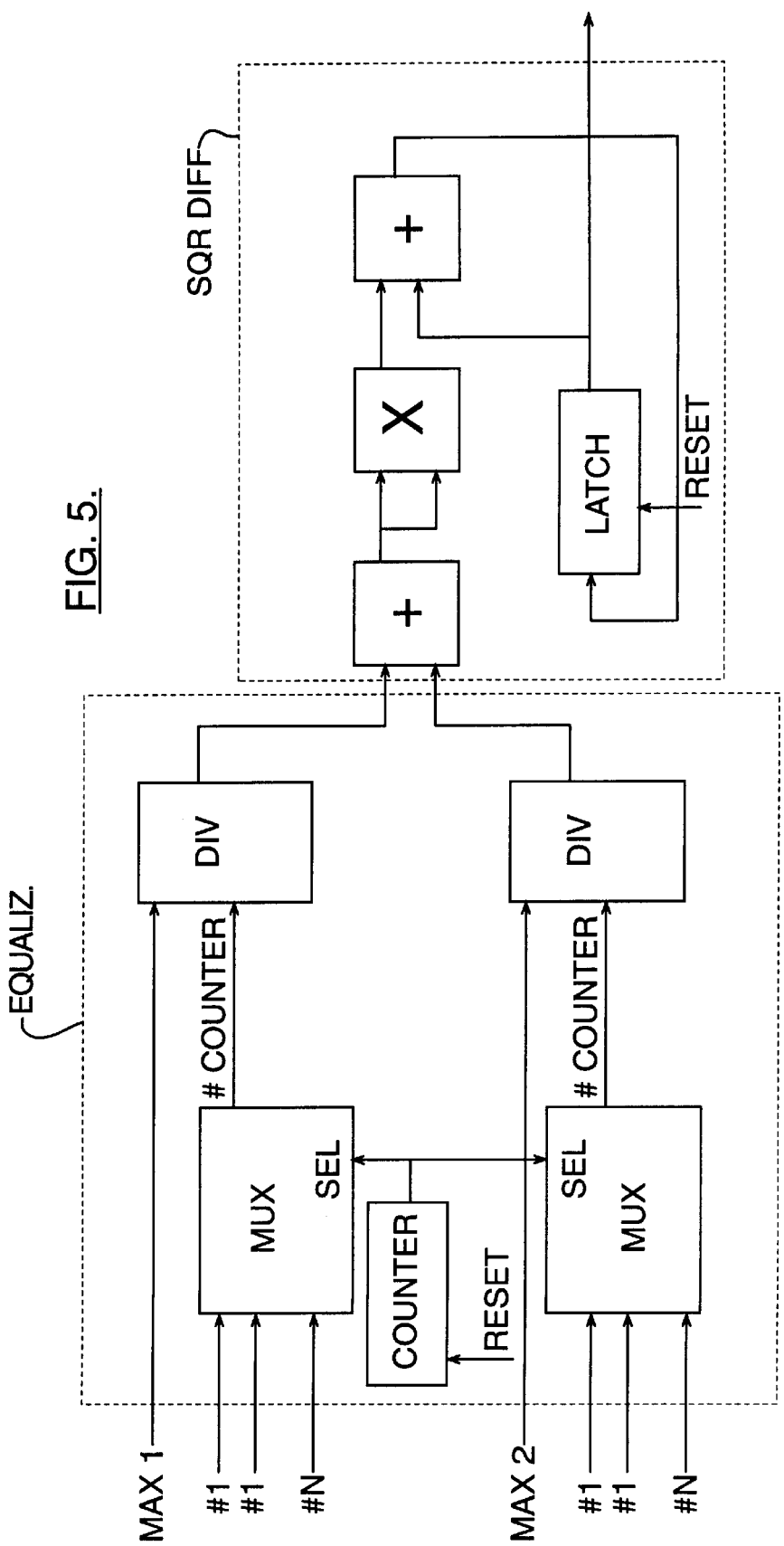
FIG. 5 shows the architecture of the metric blocks of FIG. 1 used for calculating the square of the difference of the normalized values contained in the N registers relative to two different sum values.

FIG. 5 shows a possible architecture of each of the four metric blocks. The values of the N registers relative to two different input sequences are normalized by dividing them by the respective maximum peak value, indicated in the example with max1 and max2, according to the functional scheme of the subblock Equaliz. Therefore, the subblock Sqr Diff calculates the square of the difference between the normalized values, accumulating the result in an output register (LATCH).

Finally, the block min of the complete scheme of FIG. 1, selects the minimum of the four input values: 0, 1, 2 and 3, constituted by the values present in the output registers of the four metric blocks, thus making available at its output the information of the broadcasting mode.

Figure 6:
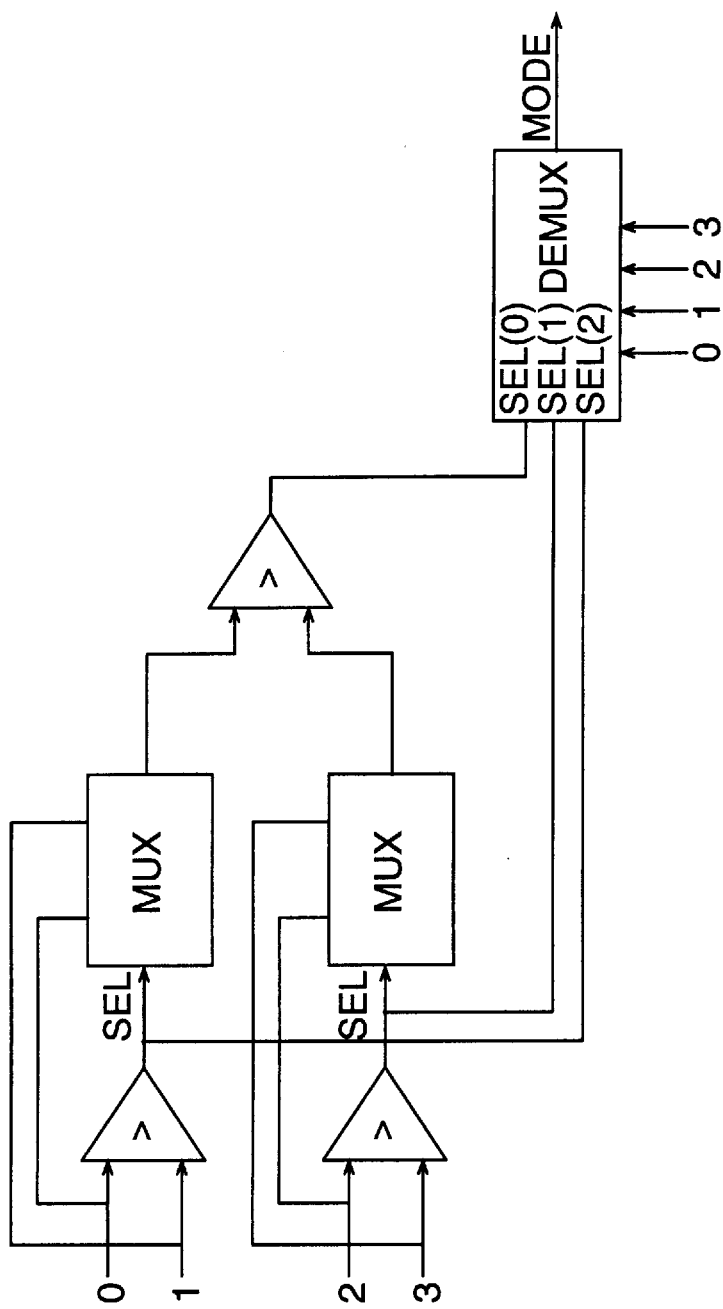
FIG. 6 shows the architecture of the min block of FIG. 1 for the detection of the minimum value among four input values constituted by the values accumulated in the output registers of the metric blocks of FIG. 5.

A functional scheme of the block min is shown in FIG. 6, wherein the four input values are indicated as 0, 1, 2 and 3.

The truth table of the DEMUX block of the scheme of FIG. 6 is as follows:

| sel (0) | sel (1) | sel (2) | mode |
|---------|---------|---------|------|
| 1 | 1 | X | 0 |
| 0 | X | 1 | 1 |
| 0 | X | 0 | 2 |
| 1 | 0 | X | 3 | where X may be any value.

As already mentioned, because the time/frequency parameters are different for the different modes of broadcasting only by a scale factor, it is sufficient to simply set a variable (mode) that defines the number of points on which it is necessary to calculate the FFT for demodulating the subsequent COFDM symbols. By calling k such a variable and C the number of carriers present in the COFDM symbol (as specified by the standards), k will be the smallest power of 2 greater than C, that is to say:

$$\text{and} \quad \begin{array}{l} k = 2^n > C \\ 2^{n-1} < C. \end{array}$$

The above described method and the architecture of the invention have been verified by computer simulation in a MATLAB environment yielding satisfactory results on all the test runs carried out.

I claim:

1. A method for automatic broadcasting mode detection (AMD) for a receiver of digital audio broadcasting (DAB) of coded orthogonal frequency division multiplexed (COFDM) signals, the method comprising the steps of:

calculating a Fast Fourier Transform (FFT) and an Inverse Fast Fourier Transform (IFFT) of a received digital input signal according to a butterfly time decimation algorithm and parallely for different numbers of points or samples of the input signal, and executing a division among complex numbers in Cartesian form (I/Q), with a dividend being represented by a complex number in Cartesian form (I/Q) resulting from a respective calculation of the FFT and a divider being a preestablished complex number;

calculating a square of a module of results of the IFFT calculation relative to numerical sequences corresponding to said different numbers of points or samples of the input signal;

detecting peaks of different numerical sequences resulting from the preceding calculation of the square and accumulating relative peak values in an N number of registers relative to each of said numerical sequences;

discriminating and storing in a dedicated register a maximum value among the peak values accumulated in said N registers for each of said numerical sequences;

calculating a square of a difference between a sum of peak values of said N registers, normalized by dividing by a relative maximum peak value and storing the results in dedicated registers; and discriminating a minimum value among contents of said dedicated registers as an information that identifies the broadcasting mode according to a relative truth table.

2. The method according to claim 1, wherein said broadcasting modes are four, said calculations of the FFT and of the IFFT are parallely performed for 128, 256, 512, 1024 and 2048 points or samples of the input signal.

3. The method according to claim 2, wherein said divider is a complex number of the type $kp/2$, where $k=0, 1, 2, 3$ depending on the broadcasting mode and on a progressive index of an input sequence.

4. An automatic mode detection (AMD) system for a receiver of digital audio broadcasting (DAB) coded orthogonal frequency division multiplexed signals (COFDM), comprising:

first means for calculating a Fast Fourier Transform (FFT) parallely for different numbers of samples of an input signal;

second means for carrying out a division among complex numbers in Cartesian form (I/Q), wherein dividends are represented by numerical sequences output by said first means, respectively, and wherein dividers are preestablished variable complex numbers pertaining to different modes of broadcasting, respectively;

third means for calculating an Inverse Fast Fourier Transform (IFFT) of numerical sequences produced by said second means, according to a butterfly time decimation algorithm;

fourth means for calculating a square of a module of results of said third means relative to numerical sequences pertaining to said different numbers of samples of the input signal.

fifth means for detecting peak values of numerical sequences produced by said fourth means and for storing said peak values in a number N of output registers relative to each of the numerical sequences, and for discriminating and storing in a dedicated register a maximum value among said peak values stored in the N output registers for each of the numerical sequences;

sixth means for calculating a square of a difference among the normalized sum values of values stored in said N output registers of said fifth means and for discriminating and storing in a dedicated register a maximum peak value; and seventh means for discriminating a minimum value among said maximum peak values stored in the dedicated registers of said sixth means.

5. The system according to claim 4, wherein said second means comprises a plurality of circuit blocks, each of which comprises:

at least a pair of multiplexers receiving the numerical sequences in a direct and an inverted form, respectively, relative to results of the calculation output in Cartesian form by said first means;

a ROM register containing preregistered values of respective dividers capable of providing selection commands to said multiplexers in the form of divider values, each of two bits, read from said ROM register; and a third output multiplexer having two inputs, coupled to the output of said at least a pair of multiplexers, respectively, and timed by a clock signal.

6. The system according to claim 4, wherein said fourth means comprises:

an input latch timed by a clock signal capable of receiving as input a numerical sequence of interleaved values, in Cartesian form, resulting from the calculation of the IFFT;

a demultiplexer timed at half a frequency of said clock signal and capable of producing at two outputs numerical sequences that correspond to values of a real part and an imaginary part, respectively, of the numerical sequence of interleaved values;

a pair of squaring blocks capable of producing numerical sequences corresponding to a square of the real parts and of the imaginary parts; and a summing circuit capable of outputting a numerical sequence corresponding to a square of a module of the numerical sequence of interleaved values and an output latch timed by the clock signal.

7. The system according to claim 4, characterized in that said fifth means comprises:

a first subblock including an input latch fed with a numerical sequence output by said fourth means and producing as output a logic 1 when an intermediate value of three consecutive input values is greater than a preceding one and is greater than a following one of said three consecutive values;

a second subblock capable of generating a selection signal which is incremented by a unit at a lapsing of each input sequence;

a third subblock capable of storing in an output latch a maximum peak value detected for each input sequence; and a fourth subblock including a number N of latches where N is equal to a length of each input sequence, one of which is selected during a reading phase by a multiplexer as a function of said selection signal, and during a writing phase by a demultiplexer as a function of the selection signal thus updating contents of said demultiplexer with current results of a summing circuit.

8. A digital audio broadcasting (DAB) receiver for coded orthogonal frequency division multiplexed (COFDM) signals, said DAB receiver comprising:

an automatic mode detection system comprising:

first means for calculating a Fast Fourier Transform (FFT) parallely for different numbers of samples of an input signal;

second means for carrying out a division among complex numbers in Cartesian form (I/Q), wherein dividends are represented by numerical sequences output by said first means, respectively, and wherein dividers are preestablished variable complex numbers pertaining to different modes of broadcasting, respectively;

third means for calculating an Inverse Fast Fourier Transform (IFFT) of numerical sequences produced by said second means, according to a butterfly time decimation algorithm;

fourth means for calculating a square of a module of results of said third means relative to numerical sequences pertaining to said different numbers of samples of the input signal;

fifth means for detecting peak values of numerical sequences produced by said fourth means and for storing said peak values in a number N of output registers relative to each of the numerical sequences, and for discriminating and storing in a dedicated register a maximum value among said peak values stored in the N output registers for each of the numerical sequences;

sixth means for calculating a square of a difference among the normalized sum values of values stored in said N output registers of said fifth means and for discriminating and storing in a dedicated register a maximum peak value; and seventh means for discriminating a minimum value among said maximum peak values stored in the dedicated registers of said sixth means.

9. The DAB receiver according to claim 8, wherein said second means comprises a plurality of circuit blocks, each of which comprises:

at least a pair of multiplexers receiving the numerical sequences in a direct and an inverted form, respectively, relative to results of the calculation output in Cartesian form by said first means;

a ROM register containing preregistered values of respective dividers capable of providing selection commands to said multiplexers in the form of divider values, each of two bits, read from said ROM register; and a third output multiplexer having two inputs, coupled to the output of said at least a pair of multiplexers, respectively, and timed by a clock signal.

10. The DAB receiver according to claim 8, wherein said fourth means comprises:

an input latch timed by a clock signal capable of receiving as input a numerical sequence of interleaved values, in Cartesian form, resulting from the calculation of the IFFT;

a demultiplexer timed at half a frequency of said clock signal and capable of producing at two outputs numerical sequences that correspond to values of a real part and an imaginary part, respectively, of the numerical sequence of interleaved values;

a pair of squaring blocks capable of producing numerical sequences corresponding to a square of the real parts and of the imaginary parts; and a summing circuit capable of outputting a numerical sequence corresponding to a square of a module of the numerical sequence of interleaved values and an output latch timed by the clock signal.

11. The DAB receiver according to claim 8, characterized in that said fifth means comprises:

a first subblock including an input latch fed with a numerical sequence output by said fourth means and producing as output a logic 1 when an intermediate value of three consecutive input values is greater than a preceding one and is greater than a following one of said three consecutive values;

a second subblock capable of generating a selection signal which is incremented by a unit at a lapsing of each input sequence;

third subblock capable of storing an output latch a maximum peak value detected for each input sequence; and a fourth subblock including a number N of latches where N is equal to a length of each input sequence, one of which is selected during a reading phase by a multiplexer as a function of said selection signal, and during a writing phase by a demultiplexer as a function of the selection signal thus updating contents of said demultiplexer with current results of a summing circuit.

* * * * *